June 26, 1923.

J. W. FRAZIER ET AL 1,460,154

PIPE COUPLING

Filed March 3, 1921

Inventors:
James W Frazier and
Fred E. Hansen
By Harold Elwo Smith, atty.

Patented June 26, 1923.

1,460,154

UNITED STATES PATENT OFFICE.

JAMES W. FRAZIER AND FRED. E. HANSEN, OF CLEVELAND, OHIO.

PIPE COUPLING.

Application filed March 3, 1921. Serial No. 449,322.

*To all whom it may concern:*

Be it known that we, JAMES W. FRAZIER and FRED. E. HANSEN, citizen of the United States, residing at Cleveland, in the county of Cuyahoga and State of Ohio, have invented a certain new and useful Improvement in Pipe Couplings, of which the following is a full, clear, and exact description, reference being had to the accompanying drawings.

This invention relates to pipe couplings of the detachable type and has for its object the provision of a simple device of this character made of the smallest possible number of parts and easily operated by hand, but free from danger of accidental disconnection while permitting a swivel motion of the attached parts. Many swivel pipe couplings have heretofore been made, but the same have generally been of a complicated, expensive and unwieldy construction, wherefore it is the purpose of this invention to provide a device of this character which shall avoid these defects. The special purposes for which this coupling is designed is the attachment of metal armored hose such as is frequently used for air under pressure, although the same is usable in many relations in the arts with all kinds of pipes.

Figure 1:
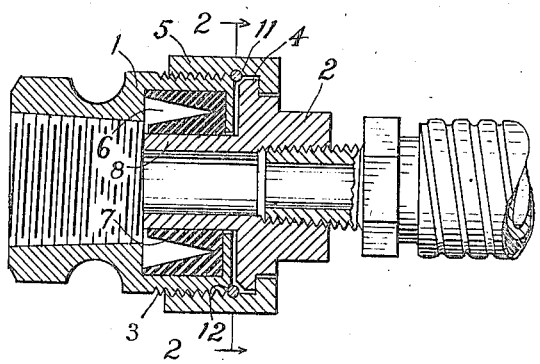
Figure 2:
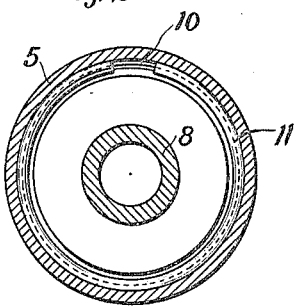

In the drawings accompanying and forming a part of this application Fig. 1 is a longitudinal sectional view through a simple coupling embodying our improvements, and Fig. 2 is a sectional view corresponding to the line 2—2 of Fig. 1.

Describing by reference characters the parts shown in these drawings, 1 represents the receiving member and 2 the entering member of the hose coupling, the former member having an externally threaded part 3, and the latter having a peripheral flange 4 which is overlapped by the flanged end of an internally-threaded gland-nut 5 adapted to be screwed upon the member 1. In the present embodiment the interior of the member 1 is formed with a hollow chamber 6 receiving a gasket 7 into which extends the cylindrical central projection 8 of the member 2; but we do not restrict ourselves to any particular gasket arrangement, nor any specific conformation of the members. We have also shown the interiors of the two members as threaded for the reception of members which are to be connected thereby but this also is open to wide variation.

Formed in the interior of the gland-nut 5 adjacent to the flange 4 is a circumferential groove 10 in which is located the spring-wire ring 11. The inner end of the member 1 is formed to engage this ring, as for example by being slightly tapered as shown at 12, the parts being so designed that this ring will be engaged by such portion before the adjacent faces of the members 1 and 2 are brought into binding engagement. The interior diameter of the ring is less than that of the flange 4, wherefore this ring has the triple function of preventing any accidental displacement of the gland-nut from the member 2 when the parts are disconnected, of limiting the insertion of the member 1 into said gland-nut when the parts are connected and of pulling the members longitudinally apart when the gland nut is unscrewed. The members are therefore left free to swivel while the gripping engagement of the member 1 against the ring 11 secures the gland-nut against accidental disconnection.

It will be understood that many changes in detail, construction, and arrangement can be made without departing from the scope of our invention and we limit ourselves only as specifically recited in our claims.

Having thus described our invention what we claim is:

1. In a pipe coupling, in combination, a pair of mating members, a third member carried by one of said members and adapted to receive the other member in engaging relation, and a means inside said third member adapted while the parts are uncoupled to prevent relative displacement between said third member and one of the mating members and adapted when the parts are coupled to prevent accidental unscrewing of said third member from the other of said mating members.

2. In a pipe coupling, in combination, a pair of mating members, one having a peripheral flange and the other having an external thread, a gland nut interlocked with said flange and having an internal thread adapted to fit said first thread, the interior of said nut also having a circumferential groove in front of said flange, and a spring wire hoop seated in said groove, adapted both to prevent displacement of said gland-nut relatively to said flange when the parts are uncoupled and to become wedged against the threaded member when the parts are coupled.

3. In a detachable coupling of the swivel type, in combination, a pair of mating members, one having a chamber and the other a projection extending into said chamber, one of said members having an external flange, a sleeve carried by said member and having an internal flange overlapping said first flange, said sleeve and the other member having interengaging projections, and means carried by said sleeve and projecting into the interior thereof adapted when the parts are disconnected to prevent separation between the sleeve and the coupling member which carries it, and also adapted when the parts are connected to engage the other coupling member in movement-arresting relation.

4. In a pipe coupling of the swivel type, in combination, a pair of mating members, one of which has an internal cylindrical chamber and the other of which has a cylindrical, axial, projection adapted to extend into said chamber, a gasket located in said chamber and having an annular groove between its inner end outer walls, its inner wall embracing said projection, one of said members having an annular flange and the other member having screw-threads, a threaded member adapted to engage such screw-threads and having a flange interlocked with said first flange, and means adapted to arrest the advance of said threaded member along said screw-thread prior to the occurrence of binding engagement between the first two members, also to impede the accidental unscrewing of said threaded member, and to draw said members apart when said threaded member is unscrewed.

In testimony whereof, we hereunto affix our signatures.

JAMES W. FRAZIER.
FRED. E. HANSEN.